United States Patent Office 3,684,450
Patented Aug. 15, 1972

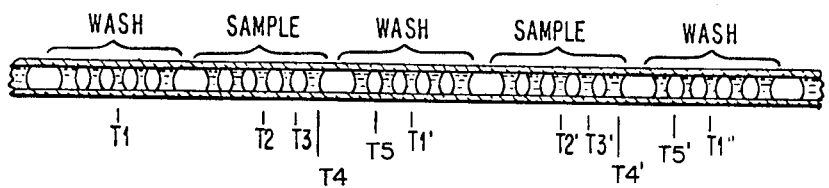
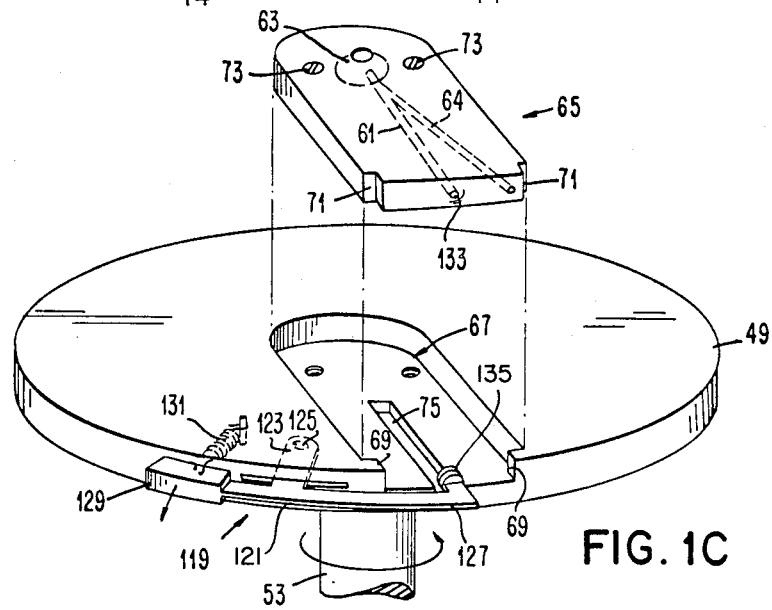
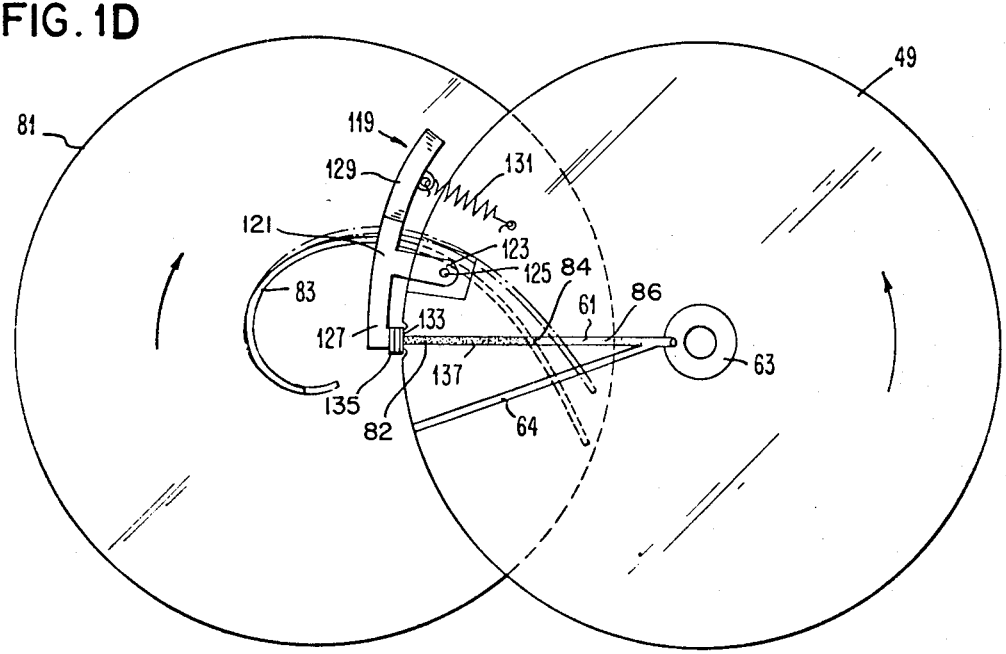

3,684,450
AUTOMATIC APPARATUS AND METHOD FOR DETERMINING THE PACKED CELL VOLUME OF WHOLE BLOOD
Stanford L. Adler, 275 Saddle River Road, Monsey, N.Y. 10952, and Kai Klemm, 1708 2nd Ave., New York, N.Y. 10828
Filed Sept. 14, 1970, Ser. No. 71,703
Int. Cl. G01n *1/10, 21/00, 33/16;* B04b *5/12*
U.S. Cl. 23—230 B            52 Claims

ABSTRACT OF THE DISCLOSURE

An automatic apparatus for determining the hematocrit of blood samples provides for the serial loading of blood samples in a same capillary chamber defined in a continuously rotating centrifuge head, and for passing wash fluid through such chamber before each loading-packing phase. The blood samples and wash fluid are introduced successively into a central well defined in the centrifuge head, and centrifugally forced into the capillary chamber. A valving arrangement operates to seal and unseal the outer extremity of the capillary chamber during the loading-packing phase and the discharge-wash phase, respectively, of each cycle.

BACKGROUND OF THE INVENTION

(1) Field of the invention

This invention relates to methods and apparatus for determining the quantity of particulates in fluid mixtures, such particulates having different specific densities and, more particularly, to methods and apparatus for determining the packed cell volume of whole blood samples.

(2) Description of the prior art

The determination of packed cell volume, or PCV, is frequently employed in hematology for determining the mean corpuscular volume of erythrocytes in blood samples and hematocrit. The packed cell volume, generally, is determined by subjecting a whole blood sample of known volume to very high centrifugal forces. While great advances have been made in the centrifuge equipments, such equipments have generally required the manual loading of blood samples into a capillary chamber, and the mounting of such chamber onto a centrifuge head for rotation at high speeds, e.g. 10,000–12,000 r.p.m. In addition, the individual capillary chamber had to be individually identified to retain a proper sample-source relationhip.

As a result of this high-speed rotation, erythrocytes in the blood samples are centrifugally separated from the plasma, and packed into the bottom portion of the capillary chamber, the lower, or outermost, strata being comprised of red blood corpuscles, the next adjacent strata being comprised of leukocytes, or white blood corpuscles, and the top, or innermost, strata being comprised of platelets.

Hematocrit, as commonly practiced, is extremely cumbersome and time-consuming, since each blood sample is introduced manually into a capillary chamber, each capillary chamber must be properly identified, in some way, with the source individual, and such procedures require that the centrifuge system be disabled, i.e. the centrifuge head be stationary, while one or more capillary chambers are being positioned.

In present-day equipment, a plurality of blood samples can be packed, and the respective packed cell volumes can be determined concurrently. However, the need for continuous human intervention and, also, the fact that the centrifuge system must be disabled to allow loading of one or more sample chambers, severely limit the processing rate and, also, introduce numerous sources of errors. For example, the proper identification of the liquid samples is a paramount importance in clinical analysis, the processing rate being of importance primarily in reducing the analysis cost.

OBJECTS OF THE INVENTION

Accordingly, an object of this invention is to provide a method and apparatus which obviates the need for human intervention in clinical analysis, and, more particularly, in determining the packed cell volume of whole blood samples.

Another object of this invention is to insure the loading of precise quantities of blood samples automatically into a capillary chamber.

Another object of this invention is to provide for the loading of a same capillary chamber with successive blood samples, in precise quantities, and for thoroughly washing such capillary chamber between the introduction of successive blood samples, without disabling the system.

Another object of this invention is to provide automatic means for determining the packed cell volume of each of a plurality of blood samples, supplied as a continuous flowing stream, while concurrently analyzing each blood sample for other constituents of interest.

SUMMARY OF THE INVENTION

These and other objects and features of this invention are achieved by the use of a speed-responsive, or a centrifugally operated, valving arrangement. The valving arrangement is adapted to seal and unseal a capillary chamber defined in a continuously rotating centrifuge head during the loading-packing phase and the discharge-wash phase, respectively. In accordance with a preferred embodiment of this invention, these distinct phases are defined by programming the centrifuge head to be rotated, at least, at different speeds, that is, in excess of and less than, respectively, an absolute speed. During the discharge-wash phase, the centrifuge head is rotated below the absolute speed, such that the valving arrangement unseals, or open ends, the capillary chamber; during the loading-packing phase, the centrifuge head is rotated in excess of the absolute speed, such that the valving arrangement seals the capillary chamber.

The individual blood samples are directed along a conduit as a continuous flowing stream separated by wash liquid and air segments, so as to be introduced alternately and successively into a central loading well in the centrifuge head, which is continuous with the capillary chamber. Accordingly, the loading of successive blood samples and, also, wash fluid into the capillary chamber is achieved without regard to the position of the centrifuge head. During the loading of each successive blood sample, the centrifuge head is programmed to rotate above the absolute speed and the capillary chamber is sealed. Also, the capillary chamber is provided with an overflow to insure the packing of a same volume of each successive blood sample. When a loaded blood sample has been subjected to centrifugal forces for a suitable period of time, the hematocrit can be measured optically and the results automatically identified and recorded. Subsequently, and while wash liquid is introduced into the loading well, the centrifuge head is programmed to rotate below the absolute speed, to unseal the capillary chamber, so as to centrifugally discharge the packed blood sample and centrifugally force wash liquid therethrough.

Other features of this invention include the provision of multiple capillary chambers along with corresponding loading wells in a single centrifuge head structure, to allow for the concurrent loading and packing of a plurality of blood samples. Also, the individual blood samples can be analyzed concurrently for other constituents. In such event, a portion of each sample and its corresponding wash fluid segment is separated from the continuous stream and directed to other automatic analysis, for example, as shown and described in the L. T. Skeggs et al. Pat. No. 3,241,432, issued on Mar. 22, 1966, assigned to a common assignee. Preferably, the respective operations of such automatic analysis equipment is phased with the operation of the centrifuge head, such that the analysis results and the packed cell volume would be recorded concurrently, so as to provide a complete patient profile.

DESCRIPTION OF THE DRAWINGS

FIG. 1B shows a continuous stream of blood samples in intervening wash fluid segments being passed along a conduit, and illustrates the phased operation of the present invention.

FIG. 1C is an exploded cabinet view of the centrifuge head.

FIG. 1D is a top view, partially phantomed, of the centrifuge head of FIG. 1A, and shows the relative positioning and structure of a light shutter for optically measuring hematocrit.

DETAILED DESCRIPTION OF THE INVENTION

Figure 1A:
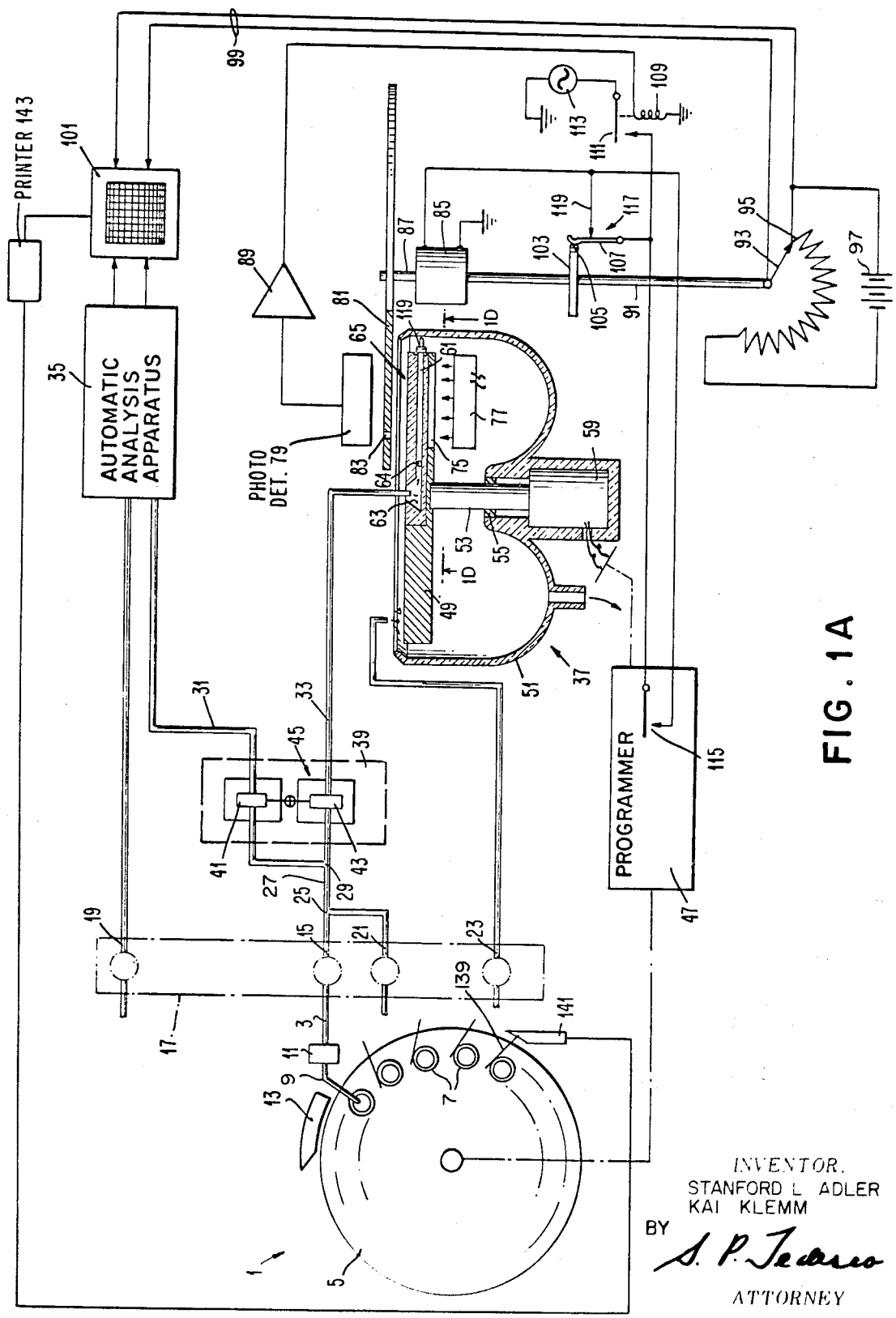
FIG. 1A is a digrammatic illustration of the method and apparatus of the present invention, wherein the automatic centrifuge apparatus is shown in cross-section.

Referring to FIG. 1A, a centrifuge system according to the present invention is illustrated as compatible with automatic analysis equipment of the prior art, e.g., as shown in the L. T. Skeggs patent, supra. The system comprises a source, generally indicated as 1, for providing a stream of successive blood samples, one after another, along a flexible conduit 3, each blood sample being separated from the adjacent sample by an intervening segment of wash liquid W disposed between a pair of air segments A, as shown in FIG. 1B. Source 1 comprises a sample plate 5, or turntable, having provisions for holding a plurality of individual sample receptacles 7. Turntable 5 is indexed intermittently to position each sample receptacle 7, in turn, at a take-off position below an off-take tube 9. Off-take tube 9 is supported laterally of turntable 5, and controlled by a suitable mechanism 11 to move into and out of a sample receptacle 7 located at the take-off position during the dwell period of sample plate 5. Also, a wash-liquid container 13, for example, containing a saline solution, is positioned adjacent sample plate 5. Off-take tube 9 is further controlled by mechanism 11 to rotate laterally and move into and out of container 13 while sample plate 5 is indexed.

Off-take tube 9 is a fluid-flow communication along conduit 3 to pump tube 15 of peristaltic pump 17, which further includes pump tubes 19, 21 and 23, peristaltic pump 17, may be of the type described in the A. Ferrari et al. Pat. No. 2,935,028, issued on May 3, 1969 and the Eduard B. M. de Jong Pat. No. 3,134,263, issued on May 26, 1964, and both assigned to a common assignee. Peristaltic pump 17 comprises a plurality of continuously moving parallel rollers, not shown, which compress so as to progressively occlude each of pump tubes 15, 19, 21 and 23 against a platen, not shown. Accordingly, off-take tube 9 successively aspirates a portion of blood sample from each receptacle 7, wash liquid from container 13 and air between successive immersions into the respective liquids.

As illustrated, pump tube 21 is open to the atmosphere, and pump tube 23 is connected to a second wash-liquid source, not shown. Pump tube 19 symbolically represents any number of pump tubes for introducing particular reagents or fluids into the system for performing of analytical tests on the blood samples, for example, as described in the L. T. Skeggs et al. patent, supra.

Pumps tubes 15 and 21 are confluent at T-fitting 25, the air being passed along tube 21 serving to further segmentize each of the successive blood samples S and wash liquid segments W, as shown in FIG. 1B, passed as a continuous stream along conduit 27. The air segments A and wash-fluid segments W effectively scrub and thoroughly cleanse the inner wall surface of the conduits along which the continuous stream is directed, whereby contamination of successive blood samples S is positively avoided. In addition, the presence of air segments A insures that the integrity of the blood samples S is maintained, since any intermixing with the wash liquid segments W is avoided.

To effect concurrent hematocrit and analysis of each successive blood sample, the continuous stream along conduit 27 is passed to a second T-fitting 29, having outlet conduits 31 and 33 in flow communication with automatic analysis apparatus 35 and with the automatic centrifuge apparatus 37, respectively. Conduits 31 and 33 are positioned between a platen 39, and pinch hammers 41 and 43, respectively, of an alternating pinch-valve arrangement 45. Pinch-valve arrangement 45 is operative to shuttle portions of the continuous stream alternately to automatic analyzer apparatus 35 and automatic centrifuge apparatus 37 along conduits 31 and 33, respectively. As hereinafter further described, each successive blood sample segment S and wash-fluid segment W directed along conduit 27 to T-fitting 29 is divided into distinct portions by pinch-valve arrangement 45, such that the sample stream directed to analysis apparatus 35 and centrifuge apparatus 37 are fully segmented. Pinch valve arrangement 45 is phased with respect to source 1 and centrifuge apparatus 37 by programmer unit 47. It is evident that multiple off-take tubes, such as 9, could be provided to pass continuous streams, as described, along each of conduits 31 and 33.

The continuous stream shuttled along conduit 33 is directed to the centrifuge apparatus 37. Centrifuge apparatus 37 comprises a circular centrifuge head 49 positioned within a container 51. Centrifuge head 49 is fixedly mounted on a spindle 53, which passes through a bushing 55 in the base of container 51. Spindle 53 is rotated by a 2-speed electric motor 59 which is controlled by programmer 47.

A radially extending capillary chamber 61 is defined in centrifuge head 49 which communicates with a central inverted-funnel shaped loading well 63. Preferably, conduit 33 extends slightly into loading well 63, so as to load successive the blood samples and wash fluid segments without regard to the position of centrifuge head 49. As more particularly illustrated in FIG. 1C, capillary chamber 61, along with an overflow bore 64 and loading well 63 may be defined in an insert member 65 formed of a clear, light-transparent plastic material. Insert member 65 is fitted and retained within a recess 67 machined in centrifuge head 49. Recess 67 includes inwardly extending peripheral arms 69 adapted to engage shoulders 71 on insert member 65; in addition, insert member 65 is clamped by screws 73 threaded in the base of recess 67 to define a functionally integral unit.

In addition, a viewing window 75 is milled through the base of recess 67. The lateral dimension of window 75 is approximately equal to the diameter of capillary chamber 61. The longitudinal dimension of window 75 corresponds to an intermediate portion of capillary chamber 61 when filled with a blood sample to be packed, say, from a PCV of 15% to a PCV of 60%. To measure packed cell volume, a light source 77 and photodetector arrangement 79 are aligned and disposed adjacent opposite surfaces of centrifuge head 49. A light shutter 81 having a circular geometry and provided with a spiral-like aperture 83, as shown in FIG. 1D, is positioned between centrifuge head 49 and photodetector arrangement 79. Light shutter 81 is rotated by synchronous motor 85 via a spindle 87. Normally, light shutter 81 is positioned, as shown in FIG. 1D, and rotated in the direction of the arrow such that discrete portions of capillary chamber 61 are scanned progressively, whereby aperture 83 tracks the interface between the supernatent fluid, or plasma, and the packed cells in the blood sample. The output of photodetector arrangement 79 is connected to the input of amplifier 89, which controls the operation of synchronous motor 85. Also, motor 85 is connected via spindle 91 to the wiping arm 93 of a potentiometer 95 connected across voltage source 97. The instantaneous position of light shutter 81 is indicated by a voltage signal along leads 99 connected to a conventional stylus recorder 101.

In adition, spindle 91 carries an annular collar 103 having a recess 105 for receiving normalizing detent 107. When detent 107 is engaged, as shown, light shutter 81 is positioned, as shown by dashed outline in FIG. 1D, to locate aperture 83 over window 75, and photodetector arrangement 79 is illuminated by source 77. At this time, programmer 47 maintains synchronous motor 85 de-energized, notwithstanding the fact that amplifier 89 is connected to coil 109 which operates to close armature 111. Notwithstanding synchronous motor 85 is disabled, since AC source 113 is open-circuited by switch arrangement 115 and, also, by switch arrangement 117 defined by detent 107 and contact 119.

To read the packed cell volume, switch arrangement 115 is closed momentarily by programmer 47 to complete the energizing circuit for synchronous motor 85 and rotate spindle 91, whereby detent 107 rides out of recess 105 to contact with contact 117, i.e. motor 85 is energized. Light shutter 81 is rotated and aperture 83 progressively scans the length of capillary chamber 61. As aperture 83 scans to interface 84 between the supernatent fluid 86 and packed cells 82 in capillary chamber 61 (FIG. 1D), the light incident on photodetector arrangement 79 is intercepted, and arrangement 79 is deactivated. At this time, the amplifier 89 is non-operational, whereby coil 109 is de-energized and armature 111 normalizes to open-circuit source 113 and disable synchronous motor 85. As hereinafter described, synchronous motor 85 remains disabled until the discharge-wash phase. During the discharge-wash phase, the packed cells are centrifugally forced from capillary 61 and photodetector arrangement 79 is energized to close armature 111. Accordingly, synchronous motor 85 is energized by source 113. When annular collar 103 is rotated to engage detent 107 in recess 105, source 113 is again open-circuited, since switch arrangement 117 is open, and synchronous motor 85 is de-energized until such time that programmer 47 closes switch arrangement 115 to initiate the loading-packing phase of a next cycle, as hereinafter described.

The loading-packing phase and the discharge-wash phase of the centrifuge apparatus 37 are determined by programmer 47 by controlling the rotational speed of centrifuge head 49 to operate valving arrangement 119. As illustrated in FIGS. 1C and 1D, valving arrangement 119 includes an elongated member 121 which is pivotally mounted on centrifuge head 49 at a center arm portion 123 by pin 125. The member 121 includes a head portion 127 which is aligned with and adapted to seal the end of capillary chamber 61. In addition, the opposite end 129 of member 121 is weighted and connected to a spring member 131 attached to centrifuge head 49. Spring member 131 normally maintains head portion 127 of member 121 lifted from the end of capillary chamber 61 when centrifuge head 49 is rotated at speeds less than the absolute speed, e.g. 18,000 r.p.m. End 129 of member 121 is weighted sufficiently to overcome the effect of spring member 131 and seat head portion 127, so as to seal capillary chamber 61, when centrifuge head 49 is rotated at speeds in excess of the absolute speed, e.g., at 20,000 r.p.m. Preferably, the outer extremity of capillary chamber 61 is structured, as shown in FIG. 1D, to define an annular valve seat 133 against which sealing pad 135 is seated.

To measure the packed cell volumes of successive blood samples, programmer 47 operates motor 59 to rotate centrifuge head 49 above and below the absolute speed whereat valve arrangement 119 is operative to seal and unseal capillary chamber 61, respectively. Also, programmer 47 controls pinch valve 45 and source 1 in phase with motor 59, such that each successive wash liquid segment W and blood sample S are split at T-fitting 29. Such phased operation is illustrated in FIG. 1B with respect to the segmented sample stream being passed along conduit 27 to T-fitting 29. Assuming that a discharge-wash phase is to be initiated at time T1, programmer 47 has reduced the speed of motor 85 below the absolute speed. At this time, head portion 127 of valving arrangement 119 is lifted by the action of spring 131 and capillary chamber 61 is open ended, whereby the previously packed blood sample is centrifugally purged. When programmer 47 operates pinch valve 45 to left hammer 43 and drop hammer 41, flow along conduit 31 to apparatus 35 is stopped and flow along conduit 33 is reinstituted. The length of conduit 33 is determined such that a previously shuttled portion of a wash liquid segment flows into loading well 63. Such wash liquid is centrifugally forced through open ended capillary chamber 61, along with air. The passage of wash liquid and air through the open-ended capillary chamber 61 insures a complete cleansing of capillary chamber, so as to prevent contamination. At time T2, after a portion of the next successive blood sample passing along conduit 33 has been discharged into loading well 63, programmer 47 rotates motor 59 above the absolute speed, whereby valving arrangement 119 closes to seal capillary chamber 61. At time T3, a sufficient quantity of blood sample has been discharged onto loading well 63 to insure complete filling of capillary chamber 61, any excess being discharged along overflow bore 64. Preferably, centrifuge head 49 is rotated in the direction of the arrow, as shown in FIG. 1D, whereby blood sample is centrifugally forced to flow along wall 137 opposite to overflow bore 64 to insure filling of capillary chamber 61. Intra-sample air bubbles, as shown in FIG. 1B, introduced into capillary chamber 61, while sealed, are displaced by the blood sample being forced radially outward, so as to be expelled along overflow bore 64. At time T3, programmer 47 reverses the pinch valve arrangement 45 whereby the pinch hammer 43 is dropped and the pinch hammer 41 is lifted to shuttle the continuous stream along conduit 31 to analysis apparatus 35 and inhibit flow along conduit 33. At time T3, a blood sample S is split at T-fitting 29 and a portion of a wash liquid segment W is positioned at the outlet of conduit 31. Sample integrity is maintained along conduits 31 and 33 by the presence of the segmentizing air bubbles. Referring to FIG. 1B, alteration of pinch valve arrangement 45 maintains the sample-air-wash sequence continuous along conduits 31 or 33.

As the centrifuge head continues to rotate above the absolute speed, the cells are packed into the outer radial end of capillary chamber 61, and the interface therebetween and the supernatent fluid is defined over window 75. At this time, photodetector arrangement 79 and amplifier 89 are operational and motor 85 is de-energized, since switch arrangement 117 is open. At time T4, programmer 47 closes switch arrangement 115 to energize motor 85 and close switch arrangement 117. As hereinabove described, light shutter 81 is rotated and aperture 83 scans along capillary chamber 61, and window 75, to the interface 84 between the supernatant plasma fluid and packed cells. When packing of the cells is completed, aperture 83 is at the interface, whereby light through capillary chamber 61 is intercepted by shutter 81 and the packed cells. At this time, since amplifier 89 is non-operational, coil 109 is de-energized to release armature 111 and motor 85 is de-energized. The output of potentiometer 95, is recorded by recorder 101 as a measurement of the packed cell volume.

Subsequently, at time T5, programmer 47 reduces the rotational speed of centrifuge head 49 below the absolute speed whereat spring member 131 unseats valve arrangement 119, so as to initiate the discharge-wash liquid phase of the cycle. At this time, detector arrangement 79 and amplifier 89 are operational and coil 109 is energized to close armature 111 to operate motor 85 until detent 107 engages in recess 105. Accordingly, the system is normalized to prepare for a next cycle, whereupon pinch-valve arrangement 45 initiates flow along conduit 33.

During each cycle, wash liquid pumped along conduit 23 is continuously dripped onto the upper surface of centrifuge head 49. Such wash liquid is centrifugally sprayed onto the interior wall surfaces of container 51 so as to wash residues therefrom.

Hematocrit for successive blood samples can be determined at a very rapid rate, due to the smallness of capillary chamber 61 and the very high centrifical forces obtained, and the automatic sequential loading of the blood samples without stopping the rotation of centrifuge head 49. The loading and measurement of the packed cell volume for each blod sample can be completed well within 60 seconds. Accordingly, the described system is compatible with "wet-chemistry" analysis performed by apparatus 35, such as described in the Skeggs et al. patent, supra. By determining the travel time of a blood sample from T-fitting 29 through analysis apparatus 35 to be slightly less than time T4, the results of the "wet-chemistry" analysis and the packed cell volume can be recorded in proper phased relationship and concurrently by recorder 101, as described in the Skeggs et al. patent, supra. Also, the source of each blood sample can be identified concurrently in correlation with the results of the "wet-chemistry" analysis and packed cell volume by attaching a sample card 139 to each receptacle 7. Each sample card 139 bears coded information identifying the source individual, which is read by a read-out mechanism 141, which includes an appropriate code converter. The output of read-out mechanism 141 is coupled to the input terminals of a digital printing mechanism 143, which operates to print the identification of the source individual adjacent the recorded results, for example, as described in the B. L. Kuch et al. Pat. No. 3,320,618, issued on May 16, 1967.

Figure 2:
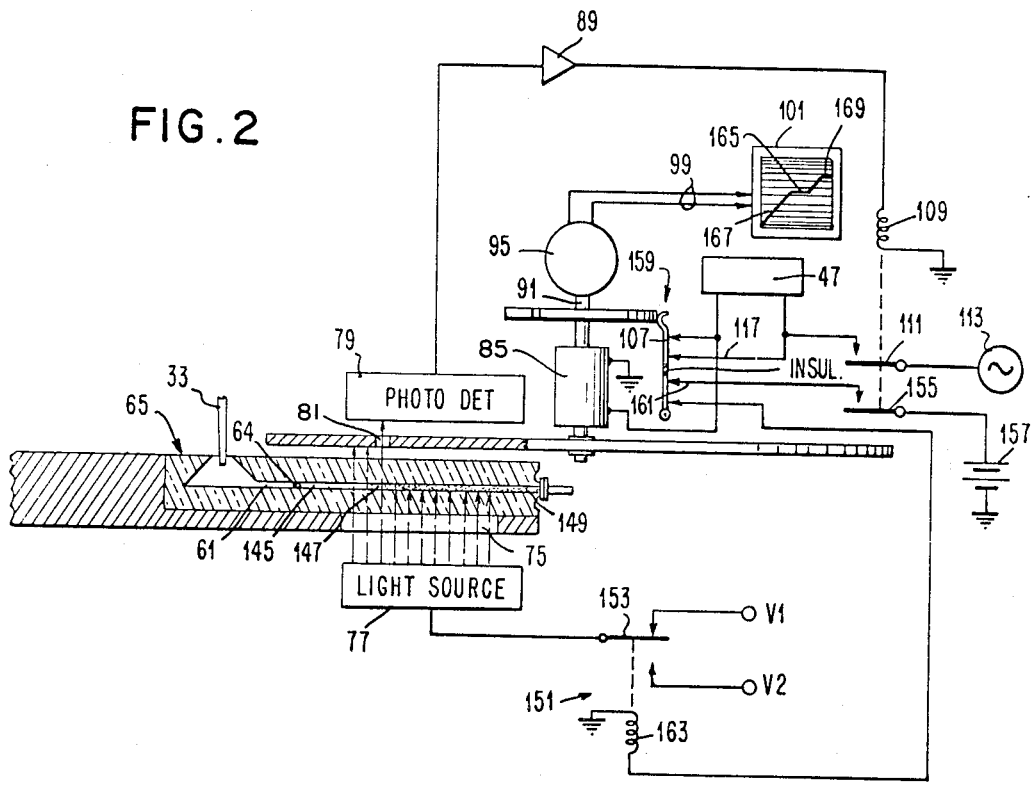
FIG. 2 is a diagrammatic illustration of an alternate embodiment of the present invention for measuring the respective volumes of red and white blood cells in a blood sample.

FIG. 2 shows an alternate embodiment of the invention, wherein provision is made for measuring the respective volumes of the buffy-layer, comprising platelets and white blood cells, and packed red blood cells. The transmission characteristics of the supernatent fluid, or plasma 145, the buffy-layer 147, and the packed red blood cells 149 are different, so as to allow for individual measurement by appropriate control of light source 77. In FIG. 2, structures described with respect to FIGS. 1A, 1C and 1D have been identified by a same reference character. Light source 77 is operated to direct a blue-green light, e.g. 5000 A., 5250 A.–5500 A., through capillary chamber 61. Light source 77 is connected alternately along fast make-slow break relay arrangement 151 to voltage sources V1 and V2. Normaly, as shown, light source 77 is connected along armature 153 of relay arrangement 151 to voltage source V1, the light passing through window 75 and capillary chamber 61 being of sufficient intensity to operate amplifier 89 when passed through plasma 145, but of insufficient intensity when passed through either buffy-layer 147 or the packed red cells 149. Initially, while light source 77 is connected to source V1, aperture 83 in light mask 81 will track along capillary chamber 61 to the interface between plasma 145 and buffy coat 147. As described above with respect to FIG. 1A, the coil 109 is de-energized to disable synchronous motor 85 when such interface is detected. At this time, coil 163 of relay 151 is energized by voltage source 157 and latched along switching arrangement 159, defined by detent 107 and contact 161, and slow-release armature 155. Closure of armature 153 to connect light source 77 to voltage source V2, where V2>V1, however, is momentarily delayed. At this time, armature 111 is normalized, or open, to disconnect source 113, and motor 85 is de-energized. The magnitude of the voltage developed across potentiometer 93 and applied along leads 99 to chart recorder 101, is indicative of the location of the interface between plasma 145 and buffy-coat 147 in capillary chamber 61. During the delayed closure of relay 111 and since the trace of recorder 101 is continuous, a plateau 165 is obtained on the recorded trace which is indicative of the total volume of buffy-layer 147 and packed red blood cells 149. Also, since the tracking of such interface by light shutter 81 is continuous, the inclination portion 167 of the continuous trace provides a precise indication of the rate at which all the cells have been packed.

When coil 163 attracts armature 153, voltage source V2 is connected to light source 77, whereby the intensity of blue-green light is increased suffiicently to operate amplifier 89 when passed through buffy-layer 147. Accordingly, amplifier 89 is operated, and coil 109 attracts armature 111. Since switching arrangement 159 is closed, motor 85 is again energized. Light shutter 81 continues to rotate and aperture 83 continues to track along capillary chamber 61. The rotation of light shutter 81 is limited, a second time, at the interface between buffy-layer 147 and packed red blood cells 149, and armature 111 is normalized to de-energized motor 85. The magnitude of the voltage developed across potentiometer 95 and applied along leads 199 to recorder 101 is indicated by a second plateau 169 on the continuous trace. The thickness of buffy-layer 147 is clearly indicated by the difference in levels between plateaus 165 and 169. The availability of this information is of great significance in clinical analysis to indicate an elevated white blood cell count, for example, anemia, and is not directly determinable by prior art techniques without physical measurement of the respective strata.

The interface between the plasma 145 and buffy-layer 147 represents the upper-most limit of the buffy-layer and the interface between the buffy-layer and the packed red blood cells 149 represents the lower limit of the buffy-layer.

Figure 3:
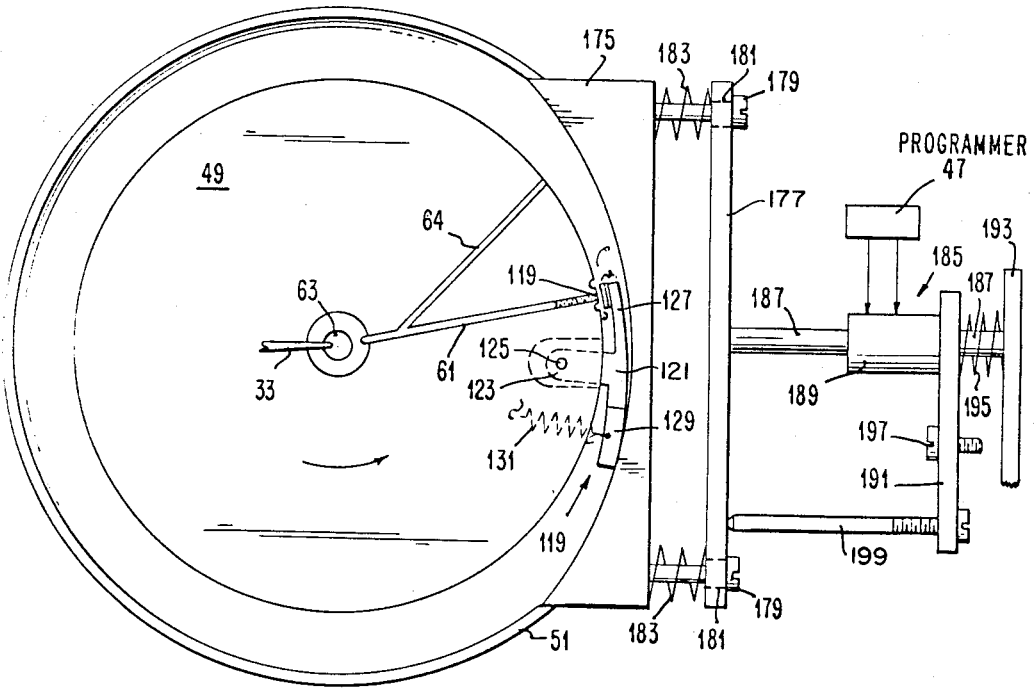
FIG. 3 is a top view of a centrifuge head according to the present invention which is operated at a constant speed above the absolute speed and the valving arrangement is mechanically operated.

In the embodiments hereinabove described, centrifuge head 49 is rotated above and below the absolute speed to define the discharge-wash phase and loading-packing phase. In FIG. 3, an arangement is illustrated wherein centrifuge head 49 is rotated continuously in excess of the absolute speed during both the discharge-wash and load-packing phases, and the valve arrangement is mechanically tripped. As illustrated, an arcuate shoe member 175 is disposed to pass through the wall of container 51 and mechanically engage the weighted end 129 of valve arrangement 119 at time T1 to initiate the discharge-wash phase. Shoe member 175 is mounted onto member 177 by means of bolts 179 which pass through openings 181 and are threaded into the body of the shoe member. Shoe member 175 is resiliently supported and spaced from base member 177 by compression springs 183. Compression springs 183 serve to reduce the impact force on valving arrangement 119 when initially contacted by the surface of the shoe member. Due to its very large radius of curvature, shoe member 175 defines, in effect, a ramp arrangement, whereby tripping and closing of valve arrangement 119 is effected gradually, rather than abruptly, during the very high-speed rotation of centrifuge head 49. As the centrifuge head is continuously rotated above the absolute speed, valve arrangement 119 normally tends to be in a closed position and capillary chamber 61 is sealed.

Shoe member 175 is introduced into container 51 by an electromagnetic arrangement 185, which is illustrative only. Base member 177 is fixedly mounted onto plunger 187 of an electromagnet 189, which is mounted on a fixed support member 191. A limiting plate 193 is supported on the opposite end of plunger 187 and confines spring 195 against support member 191 for normally retaining shoe member 175 withdrawn from container 51. Spacing screws 199 and 197 are threaded in support member 191 and adapted to contact base member 177 and plate 193, respectively, so as to limit movement of shoe member 175 into and out of container 51. Spacing screw 197 is adjusted such that, when electromagnet 189 is energized, shoe member 175 penetrates into chamber 51 sufficiently to contact, at least along a central portion thereof, and trip weighted end 129 of valving arrangement 119.

To initiate a discharge-wash phase, at time T1 as shown in FIG. 1B, electromagnet 189 is energized by programmer 47 to introduce shoe member 175 into container 51. Although valve arrangement 119 is tripped only momentarily during each revolution of centrifuge head 49, the contents of capillary chamber 61 are very rapidly purged due to the very large centrifugal forces to which they are subjected. Successive trippings of valve arrangement 119 during time interval T1–T2 and while wash liquid is being discharged into loading well 63 provides for very effective cleansing of capillary chamber 61. The operation of the system of FIG. 3, during the loading-packing phase, is substantially as described above. Electromagnet 189 is only energized during the discharge-wash phase. Otherwise, shoe member 175 is withdrawn from container 51, and the loading-packing phase and the measurement and recording of the packed cell volumes of the successive blood samples passed along conduit 33 are effected in the manner described.

Figure 4A:
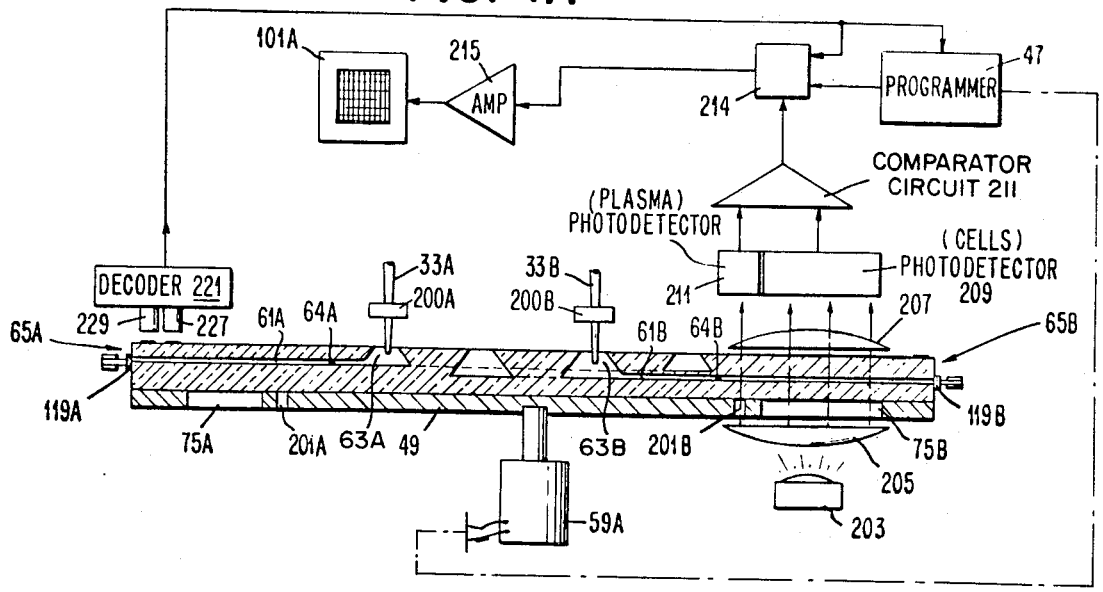
FIGS. 4A and 4B illustrate an alternate embodiment of the invention for measuring a plurality of packed cell volume determination concurrently.
Figure 4B:
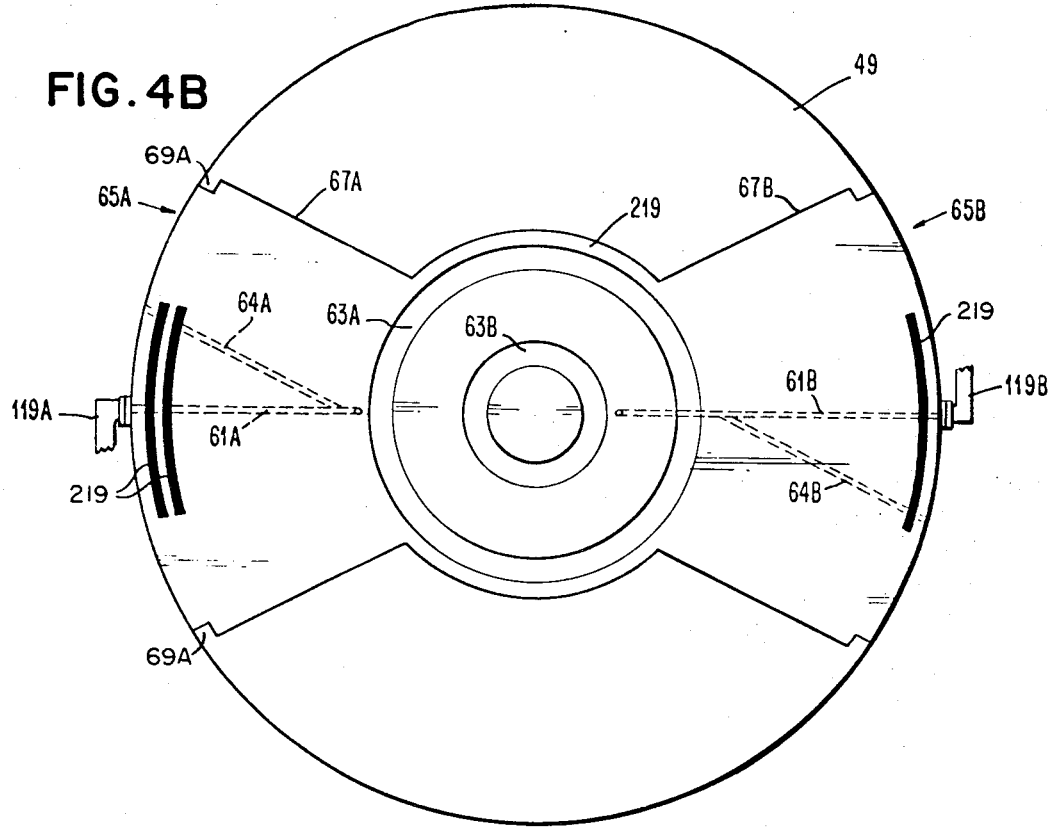

FIGS. 4A and 4B illustrate an alternative embodiment of the invention for measuring a plurality of hematocrits concurrently. The respective structures of capillary chambers 61A and 61B, defined in centrifuge head 49A, are essentially as described above. Each capillary chamber 61A and 61B is provided with an overflow bore 64A and 64B, respectively. In addition, capillary chambers 61A and 61B are sealed by valving arrangements 119A and 119B, respectively, which operate in the manner described. To concurrently load blood samples, capillary chambers 61A and 61B are in flow communication with loading wells 63A and 63B, respectively, defined in concentric fashion in centrifuge head 49A. For example, capillary chambers 61A and 61B and loading wells 63A and 63B can be defined in an insert member 65A, as particularly shown in FIG. 4B which is received in a recess 67 defined in the centrifuge head 49. Recess 67A is provided with arms 69A for engaging the insert member 65. Further, insert member 65 can be clamped in the base of recess 67 to define a functionally integral unit. Conduits 33A and 33B each directs continuous stream of succesive blood samples, as shown in FIG. 1B, into loading wells 63A and 63B, respectively. The flowing streams along conduits 33A and 33B are phased, such that samples and wash liquid segments are discharged into the respective loading wells 63A and 63B concurrently. In addition, pinch valves 200A and 200B are associated with conduits 33A and 33B, to interrupt the flow therealong during the loading-packing phase of each cycle, as described. The discharge-wash phase and the loading-packing phase are substantially identical to those described with respect to FIG. 1A.

To initiate a discharge-wash phase, programmer 47 controls motor 59A to reduce the speed of rotation of centrifuge head 49A below the absolute speed, for example, at time T1 of FIG. 1B. At this time, valving arrangements 119A and 119B open end capillary chambers 61A and 61B concurrently, whereby the packed cells present therein are centrifugally purged. At this time, pinch valves 200A and 200B are lifted and wash liquid segments at outlets of conduits 33A and 33B are discharged concurrently into loading wells 63A and 63B, respectively. At time T2, as shown in FIG. 1B, programmer 47 increases the rotational speed of motor 59A and centrifuge head 49A above the absolute speed, whereat valving arrangements 119A and 119B seal corresponding capillary chambers 61A and 61B. Subsequently, blood samples are discharged concurrently from conduits 33A and 33B into loading wells 63A and 63B, respectively, and centrifugally loaded into capillary chambers 61A and 61B, respectively.

In the present embodiment, packed cell volume of blood samples in each of capillary chambers 61A and 61B can be measured in concurrent or sequential fashion. Viewing windows 75A and 75B are milled in centrifuge head 49A so as to be aligned with capillary chambers 61A and 61B, respectively, when insert 65 is positioned on centrifuge head 49A. In addition, secondary windows 201A and 201B are milled in centrifuge head 49A and aligned with viewing windows 75A and 75B, respectively, and located radially outwardly from overflow bores 64A and 64B, respectively. A light source 203 and a collimating lense arrangement 205 are positioned below centrifuge head 49A. As centrifuge head 49A is rotated, capillary chambers 61A and 61B along with corresponding windows 75A and 201A and windows 75B and 201B, respectively, are successively positioned so as to be illuminated by light source 203. Light passing through portions of each capillary chamber 61A and 61B is focused by lense arrangement 207 onto a photodetector arrangement 209 and secondary photodetector arrangement 211, respectively, the respective outputs of which are directed to a comparator circuit 213. In the readout technique illustrated, photodetector arrangement 209 integrates the total light passing through portions of each capillary chamber along the corresponding viewing window 75, which is indicative of the packed cell volume. Since the transmission characteristics of the supernatent fluid, or plasma, in different blood samples is not necessarily the same, the output of secondary photodetector arrangement 211 serves as a reference and is indicative of the transmission characteristics of the supernatent fluid in the particular blood sample. Comparator circuit 213 functions, essentially, to compare the outputs of photodetector arrangements 209 and 211, whereby an accurate measure of hematocrit is obtained.

To identify the particular capillary chamber 61A or 61B passing between light source 203 and photodetectors 201 and 211, an encoding arrangement, illustrates in FIG. 4B, is provided on the upper surface of insert 65. Such encoding arrangement can be defined on insert member 65 by a coded arrangement of opaque markings 219 arranged in concentric fashion and identifying a particular capillary chamber. Programmer 47 controls logic circuit arrangements 214 to distinguish the outputs of comparator 213 corresponding to capillary chambers 61A and 61B, respectively, to be measured. Logic arrangement 214 is connected to an amplifier arrangement 215 which drives the recorder 101A. A decoder 221 is provided for reading the information represented by markings 219 while centrifuge head 49A is rotated, so as to identify the particular capillary chamber positioned between lense arrangement 205 and photodetector arrangement 209. Since only two capillary chambers are illustated, the coding sequence can be relatively simple, each capillary chamber being represented by the binary word "0, 1" or "1,1," respectively.

As centrifuge head 49A is rotated, capillary chambers 61A and 61B and corresponding coded identification thereof are positioned successively beneath the photodetector arrangement 209 and decoder 221. The output of decoder 221 is directed to one input of logic arrangement 214. Programmer 47 controls logic arrangement 214 on a coincidence basis, so as to direct the output of comparator circuit 213 to the amplifier arrangement 215 when the packed cell volume is a selected capillary chamber is to be measured. Correspondingly, during such time that an improper code is being read, logic arrangement 214 remains disabled, whereby selectively is achieved.

Preferably, programmer 47 delays measurement of the packed cell volume until such time that packing of the capillary chambers 61A and 61B has been completed. Because of the very high rotational speed of the centrifuge head, complete packing is substantially insured within 30 seconds of the loading of the individual blood sample into capillary chambers 61A and 61B. Programmer 47 can be sub-programmed to control logic arrangement 214 to allow measurement of the packed cell volume in capillary chambers 61A and 61B on a successive basis. Alternatively, the packed cell volumes in capillary chambers 61A and 61B can be measured concurrently by providing a plurality of logic arrangements such as 214, each corresponding to a particular capillary chamber and having inputs multiplied to comparator circuit 213 and outputs multiplied to an amplifier 215. The plurality of logic arrangements are successively enabled by programmer 47 in proper sequence when a corresponding capillary chamber is positioned beneath the photodetector arrangement 209. In such event, the output of the comparator 211 is switched so as to be amplified by amplifier 215 and directed to a corresponding recorder such as 217. Alternatively, the output of such plurality of logic arrangements could be directed to a single register, with a subsequent readout so as to be recorded on an individual basis.

What is claimed is:

1. A method for determining the volume of particles suspended in a liquid, comprising the steps of continuously rotating a head member supporting a liquid-receiving chamber having at least one end normally open to generate centrifugal forces along at least a portion of said chamber, loading the particle-contained liquid into said head member while being rotated, so as to centrifugally introduce said particle-containing liquid into said chamber, and subsequently measuring the packed volume of said particles in said portion of said chamber.

2. The method of claim 1 including the further step of unsealing said chamber subsequent to measurement of said packed volume and while said centrifuge head is continuously rotated, such that the packed particles along with the said liquid are contrifugally purged from said chamber.

3. The method of claim 2 further including the step of maintaining said chamber unsealed for a time interval subsequent to the centrifugal purging of said packed particles and said liquid from said chamber.

4. The method of claim 2 further including the step of introducing a subsequent particle-containing liquid into said chamber while said centrifuge head is continuously rotated, and sealing said chamber prior to the introduction of said subsequent liquid segment.

5. The method of claim 3 further including the step of passing a wash liquid through said chamber during said time interval, so as to cleanse the inner surface walls of said chamber.

6. The method of claim 3 further including the step of allowing air to pass through said chamber during said time interval, so as to cleanse the interior surface walls of said chamber.

7. The method of claim 1 including the further step of optically measuring the packed volume of said particles while said chamber is rotated.

8. The method of claim 4 including the further step of introducing said liquid and said subsequent liquid as discrete segments into said chamber, passing said discrete segments as a continuous stream for introduction into said chamber, sealing said chamber prior to the introduction of each of said discrete segments, and unsealing said chamber subsequent to measurement of said packed volume of particles in each of said discrete segments.

9. The method of claim 8 including the further step of separating said discrete segments in said continuous stream by at least one air segment, whereby the integrity of said discrete segments is maintained.

10. The method of claim 8 including the further step of separating said discrete segments in said continuous stream by a wash liquid segment, and phasing the flow of said continuous stream to introduce said wash liquid segment into said chamber, while said chamber is unsealed.

11. The method of claim 8 including the further step of overflowing excess portions of said discrete segments introduced into said chamber, whereby the packed volume of particles in predetermined volume of each of said discrete segments is measured.

12. The method of claim 8 including the further step of passing said liquid and subsequent liquid as a continuous stream along a first conduit, shuttling portions of said continuous stream along a second conduit and along a third conduit, whereby continuous streams comprising discrete segments of said liquid and said subsequent liquid are directed along said second and third conduits, analyzing portions of each of said discrete segments for a particular constituent of interest, and introducing said discrete segments passed along said third conduit in turn into said chamber while said centrifuge head is rotating to measure the packed volume of particles therein.

13. The method of claim 12 including the further step of recording analysis results and measurements of said packed volume in correlation.

14. The method of claim 13 including the further step of phasing the analysis of said constituent of interest and the measurement of said packed volume of each of said liquid and said subsequent liquid passed as discrete segments along said second and third conduits, respectively, for recording on an alternate, time-sequenced basis.

15. The method of claim 14 including the further step of identifying the recordings of said analysis and said measurement with respect to the respective sources of said liquid and said subsequent liquid.

16. The method of claim 2 including the further step of controlling the speed of rotation of said centrifuge head to unseal said chamber.

17. The method of claim 1 including the further step of continuously recording the measurement of the packed volume of particulates to indicate the rate of packing of said particles.

18. Apparatus for determining the volume of colloidal particles suspended in a liquid medium, comprising means defining a chamber having at least one end which is normally open, means for rotating said defining means so as to generate centrifugal forces at least along a portion of the length of said chamber, means for introducing a particle-containing liquid into said portion of said chamber while said defining means is being rotated, said introducing means including a loading well defined in said defining means and in communication with said chamber, and means for introducing said particle-containing liquid into said loading well while said defining means is being rotated, whereby said particle-containing liquid is centrifugally introduced into said chamber, means for retaining said particle-containing liquid in said chamber to subject said particles to said centrifugal forces, whereby said particles are packed in said chamber, and means for measuring the packed volume of particles in said chamber.

19. Apparatus as defined in claim 18 further including means for successively introducing segments of different particle-containing liquids into said loading well, such that said segments can be loaded successively into said chamber.

20. Apparatus as defined in claim 19 further including means for determining that a same volume of each of said segments is loaded into said chamber.

21. Apparatus as defined in claim 19 wherein said introducing means further includes means for passing a wash liquid through said chamber intermediate the successive loading of said segments into said chamber.

22. Apparatus as defined in claim 19 including means for directing different particle-containing liquids on a separate and discrete basis, and means for shuttling portions of each of said different liquids along a first conduit and a second conduit, respectively, said first conduit being in fluid flow communication with said introducing means, and analyzing means connected to said second conduit for analyzing said shuttled portions of said different liquids directed therealong for another constituent of interest.

23. Apparatus as defined in claim 19 further including means for discharging each of said segments, in turn, from said chamber prior to the introduction of a next successive sample into said chamber, such that the packed volume of particles in each of said segments is measured in turn.

24. Apparatus as defined in claim 23 further including means for normalizing said measurement means subsequent to the measurement of the packed volume of particles in each of said segments.

25. Apparatus according to claim 18 wherein said chamber includes means for determining the volume of said particle-containing liquid subjected to said centrifugal forces.

26. Apparatus according to claim 25 wherein said chamber includes means for overflowing portions of said particle-containing liquid introduced therein which is in excess of a predetermined volume.

27. Apparatus according to claim 26 wherein said defining means comprises a first bore member which defines said chamber, and said overflow means comprises a second bore connected along a portion of said first bore.

28. Apparatus according to claim 18 wherein said loading well is concentric with the axis of rotation of said chamber.

29. Apparatus according to claim 18 wherein said defining means further defines a second chamber, said first and said second chambers having individual loading wells for receiving liquid samples, said introducing means being operative to introduce particle-containing liquid in said loading wells.

30. Apparatus according to claim 29 wherein said individual loading wells are defined in concentric annular fashion.

31. Apparatus according to claim 18 wherein the other end of said chamber is sealed by a valve arrangement.

32. Apparatus according to claim 31 wherein said valve arrangement is speed-responsive.

33. Apparatus according to claim 32 wherein said valving arrangement is operative to seal said chamber while said defining means is rotated above an absolute speed.

34. Apparatus according to claim 32 further including control means for rotating said defining means above said absolute speed during introduction of said liquid into said chamber and for rotating said defining means below said absolute speed to discharge said liquid from said chamber, said valving arrangement being operative to seal said chamber above said absolute speed and to unseal said chamber below said absolute speed.

35. Apparatus according to claim 34 further including means for intermittently introducing segments of different particle-containing liquids into said chamber, said control means being operative to rotate said defining means above said absolute speed to retain each of said different liquids in said chamber, in turn, whereby the packed volume of each of said different liquids can be measured, said rotating means being further operative to rotate said defining means below said absolute speed for discharging each of said different liquids from said chamber, in turn, and means for measuring the packed volume of each of said different liquids.

36. Apparatus according to claim 18 wherein said rotating means includes a plate-like member.

37. Apparatus according to claim 36 wherein said defining member is fitted as an insert into and retained in said plate-like member as a functionally integral unit.

38. Apparatus according to claim 32 further including means for controlling said valving arrangement to unseal said chamber.

39. Apparatus according to claim 38 further including means for mechanically operating said valving arrangement.

40. Apparatus according to claim 18 further including optical means for measuring the packed volume of particles in said chamber.

41. Apparatus according to claim 40 wherein said optical means includes means for tracking the interface formed between said particles while being packed and said liquid in said chamber.

42. Apparatus according to claim 41 further including means for continuously recording the tracking of said interface, so as to provide an indication of the rate of packing of said particles in said chamber.

43. Apparatus according to claim 40 wherein said optical means includes a scanning light aperture, means for passing light through said aperture and said chamber cleared of said particles, and means responsive to said light passing through said aperture and said chamber.

44. Apparatus according to claim 43 further including recorder means responsive to said optical means for providing an indication of said packed cell volume of particles in said chamber.

45. Apparatus according to claim 40 further including means for normalizing said optical means subsequent to a measurement of the packed volume of particles in said chamber.

46. Apparatus according to claim 40 wherein said optical means includes means for passing light through said chamber, and means for integrating the total light passed through said chamber to provide an indication of said packed volume in said chamber.

47. Apparatus according to claim 40 further including means for phasing the operation of said optical means and said introducing means.

48. Apparatus according to claim 19 further including means for supplying said segments of said different liquids separately and discretely to said introducing means as a continuous stream, and means for controlling said introducing means to introduce each of said segments in successive fashion into said loading well, and means for measuring the packed volume of each of said segments introduced into said chamber, in turn.

49. Apparatus according to claim 48 further including conduit means connected to said introducing means and supplying said samples as a continuous flowing stream along said conduit, adjacent samples in said stream being separated by an inert immiscible fluid segment.

50. The method of claim 1 further including the step of centrifugally purging said packed volume of said particles from said portion of said chamber subsequent to the measurement thereof.

51. The method of claim 50 further including the step of directing a plurality of particle-containing liquids, in turn, for loading each of said particle-containing liquids into said head member, so as to be centrifugally introduced into said chamber, subsequent to the purging of the packed volume of particulates of a preceding liquid from said chamber, the loading of said each liquids being effected while said head member is being continuously rotated.

52. The method of claim 51 further including the step of cleansing at least said portion of said chamber prior to the centrifugal introduction of said each liquids said cleansing being effected while said head member is being continuously rotated.

References Cited
UNITED STATES PATENTS

| | | | |
|---|---|---|---|
| 3,211,530 | 10/1965 | Harvey | 23—253 |
| 3,415,627 | 12/1968 | Rait | 23—259 X |
| 3,532,470 | 10/1970 | Rochte | 23—253 |
| 3,555,284 | 1/1971 | Anderson | 23—259 X |
| 3,586,484 | 6/1971 | Anderson | 23—259 |

MORRIS O. WOLK, Primary Examiner

R. E. SERWIN, Assistant Examiner

U.S. Cl. X.R.

23—230 R, 253 R, 259, 292; 73—61.4; 210—78; 233—1 R; 250—218; 356—36, 39